United States Patent Office 3,001,722
Patented Sept. 26, 1961

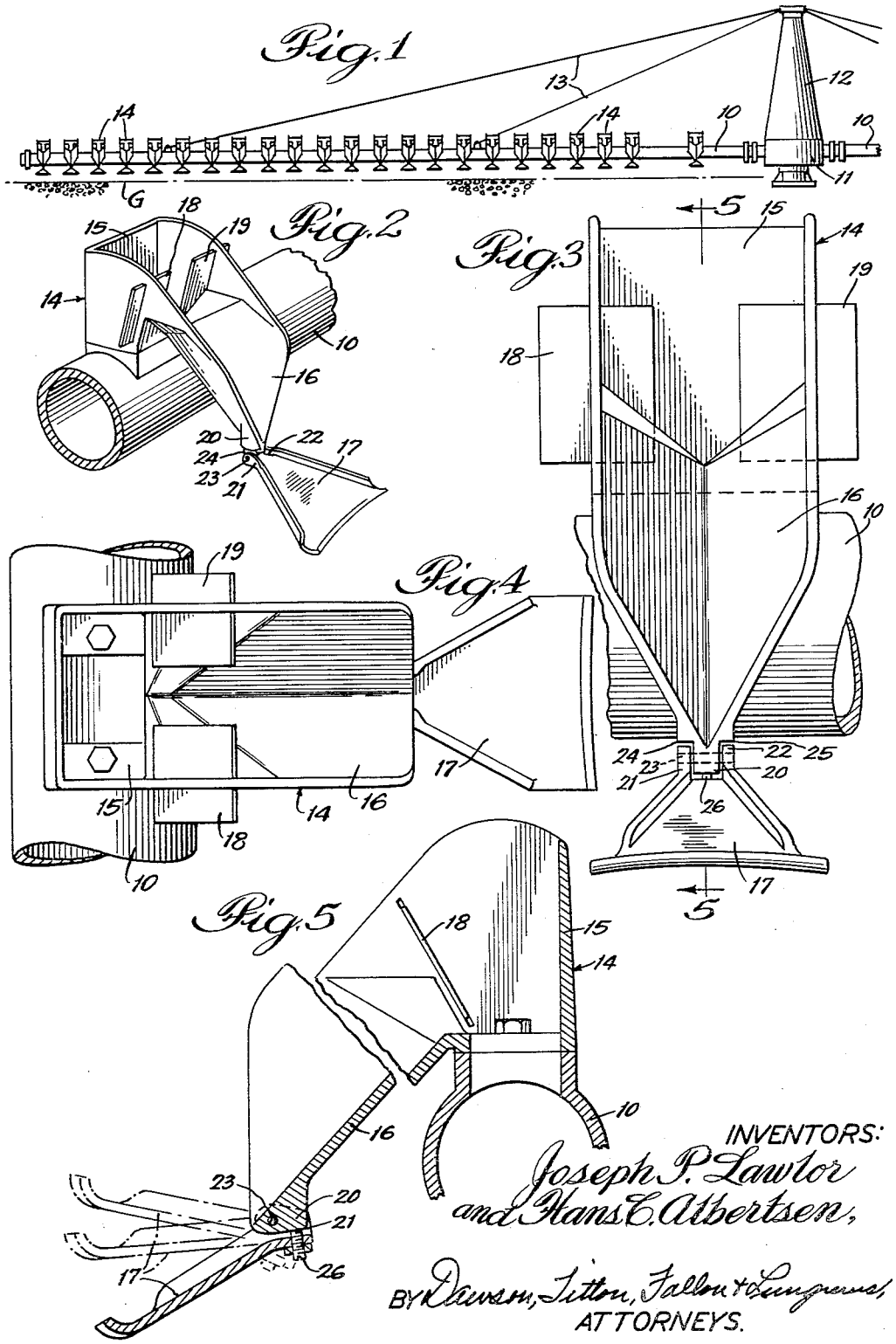

3,001,722
DEVICE FOR DISTRIBUTING SEWERAGE WATER OVER AN OUTDOOR FILTER BED
Joseph P. Lawlor and Hans C. Albertsen, Ames, Iowa, assignors to General Filter Company, Ames, Iowa, a corporation of Iowa
Filed Dec. 5, 1958, Ser. No. 778,476
5 Claims. (Cl. 239—254)

This invention relates to a device which is especially adapted for distributing sewerage water over an outdoor filter bed. The device has utility in connection with any filter beds where the development of obstructions on top of the beds creates a problem, and this problem exists to some extent with respect to indoor as well as outdoor filter beds.

In connection with reaction propulsion devices for distributing sewerage water over outdoor filter beds certain problems have heretofore been encountered. It is the object of the present invention to provide a device which substantially overcomes these problems. The objectives and advantages of the present invention will become apparent as the specification proceeds.

Rotary devices which are actuated by a reaction or a jet-type propulsion provide a mechanically simple mechanism for distributing sewerage water over filter beds. One problem with such devices, however, is how to obtain a substantially uniform distribution of the water over a circular filter bed. The use of reaction propulsion tends to lead to variations in the hydraulic head at the various discharge outlets which in turn tends to produce an uneven spraying of the water on the filter bed. Further, in order to utilize this principle of operation at all on a practical basis, it is necessary to have the rotating manifolds positioned in close proximity to the upper surface of the bed, which is usually formed of coarse gravel or crushed rock. If the manifold and spray elements are spaced very far above the surface of the bed, there is insufficient hydraulic head available to provide the desired reaction propulsion, and this also leads to an uneven distribution of the water.

Further, in order to achieve proper operation of such rotary fluid distributors, it is necessary to have the combination propulsion reactors and water spreaders arranged so as to extend it downwardly from the rotating distribution manifolds to within a few inches of the upper surface of the filter beds. For example, in many cases this clearance would not exceed three to four inches. Consequently, any upwardly extending obstructions that might develop on the surface of the filter beds would tend to block the movement of the distributor device. This problem is particularly acute in connection with outdoor filter beds which are subjected to freezing conditions during the winter months. Under extreme conditions of cold weather, ice and snow may build-up in areas on the surface of the filter bed and provide obstructions which can lead to breakage of the equipment. In the device of the present invention, however, efficient operation can be maintained throughout the winter months without sacrificing uniformity of distribution of the water and without leading to breakage of components of the apparatus.

The present invention is shown in an illustrative embodiment in the accompanying drawing, in which FIGURE 1 is a broken rear elevation showing generally the center column assembly and a representative distributor arm having a plurality of spaced reactors and spreaders; FIGURE 2 is a fragmentary perspective view of a reactor and spreader mounted on the distributor arm; FIGURE 3 is a rear elevation of the reactor and spreader of FIGURE 2; FIGURE 4 a plan view of the same elements and FIGURE 5 a side elevational sectional view, the section being taken on line 5—5 of FIGURE 3.

Looking first at FIGURE 1 there is shown a portion of a rotary fluid distributor of the kind with which the present invention is designed to be employed. In the illustration given, the device includes horizontally-extending manifolds or hollow arms 10 which are supported for axial rotation about a central hub 11. The arms are usually employed in a balanced arrangement including two to eight arms. Above the hub extends a tower 12 from the top of which support wires 13 extend to spaced positions on the arms 10. The manifold arms 10 are adapted to move in an established direction over the upper surface of a filter bed in close proximity thereto. For example, in the illustration given, the direction of rotation of the FIGURE 1 device would be as indicated by the arrows, and the gravel G comprising the filter bed would extend to the level indicated.

A plurality of reactors 14 are mounted on manifold arms 10 at spaced intervals therealong, as shown in FIGURE 1. As shown more clearly in FIGS. 2 to 5, each of the reactors 14 provides a chamber 15 communicating with the interior of the arm 10, a discharge spout 16 extending downwardly from chamber 15 in a direction opposite to the direction of rotation of the arm, and a spreader plate 17 mounted on the lower end of spout 16 and extending outwardly therefrom in the same general direction as the spout. Preferably, an adjustable weir means, such as provided by laterally shiftable plates 18 and 19 are interposed between chamber 15 and spout 16. In the illustration given, plates 18 and 19 are respectively received within vertically extending slots in the side walls of reactor 14, the engagement between the plates and the slots being frictionally tight but permitting the plates to be shifted inwardly or outwardly to provide selectively a larger or smaller discharge opening therebetween.

According to the present invention there is provided means interconnecting the lower ends of spout 16 and the inner ends of spreader plates 17 permitting the spreader plates to swing freely around a horizontal axis over an arc of movement between a point at which the outer ends of the spreader plate is below its inner end and a point at which the outer end is above its inner end. FIGURE 2 shows the spreader plate in its elevated position, while FIGURE 5 shows the spreader plate in its downwardly extending position. It will be understood that the spreader plate is free to swing or pivot between these two positions.

In association with the means interconnecting the lower ends of the spout 16 and the inner ends of spreader plate 17 there is also provided in accordance with the present invention positive stop means respectively limiting the downward and upward swinging movements of the spreader plates. The particular details of construction of the inner connecting means and the stop means shown in the drawing will subsequently be described in detail. At this point, however, it is desired to point out that the stop means limiting the upward movement of the spreader plate should be arranged to prevent the plates from swinging upwardly beyond a point at which they will automatically swing downwardly. Also, it is preferred to have the stop means limiting the downward movement of the spreader plates adapted for adjustment so that the downward inclination of the plates can be selectively varied.

Any interconnecting and stop means which are suitable for accomplishing the above results may be employed. In the illustration given, the lower end of spout 16 provides a depending nose portion 20 which is received between upwardly extending ears 21 and 22 which are provided by the inner end of spreader plate 17. As shown more clearly in FIGURES 3 and 5, aligned openings extend through the nose 20 and the ears 21 and 22.

A pin 23 extends through these openings and thereby interconnects the spout 16 and the spreader plate 17, the outer ends of the pin being fixedly received within the ears 21 and 22 and loosely received within the opening through nose 20.

In the illustration given, the upward swinging movement of spreader plate 17 is limited by the engagement of the top edges of ears 21 and 22 respectively with the shoulders 24 and 25 which are provided by the lower end of spout 16 and extend outwardly just above nose 20. The arrangement is such that the upwardmost position of the spreader plate is still forwardly of a vertical plane through the pivot axis provided by pin 23, and accordingly unless supported by some external force it will fall downwardly under its own weight.

In the illustration given, the downward swinging movement of spreader plate 17 is limited by an adjustable set screw 26 which extends upwardly through the portion of the spreader plates between ears 21 and 22 and engages the lower edge of nose 20. This arrangement is shown most clearly in FIGURE 5.

In the operation of the device, sewerage water containing organic impurities and requiring filtration would be introduced into hub 11 and distributed outwardly through the manifold arms 10. The water would then flow into each of the reactor chambers 15, pass through the opening provided between weir plates 18 and 19 into spout 16, and then onto spreader plate 17 for distribution over the upper surface of the filter bed. At the same time, the arms would be driven in the direction indicated by the arrows in FIGURES 1, 2 and 5. In other words, the spout 16 and spreader plate 17 extend downwardly and outwardly in a direction opposite to the direction of rotation of the arms 10. The discharge of the sewerage water thereby creates a reaction force which causes the arms to rotate.

During the normal operation of the device, the spreader plate 17 will extend downwardly as indicated by the solid lines in FIGURE 5. Thus, the clearance between the upper surface of the filter bed and the outer or lower end of the spreader plates will be considerably smaller than the clearance between the manifold arms 10 and the filter bed or even the lower ends of spout 16 and the filter bed. Under actual conditions of use, the clearance between the outer or lower ends of the spreader plate 17 and the filter bed may not exceed two to three inches. Consequently, any abnormal obstruction extending upwardly from the surface of the filter beds would be quite likely to strike the spreader plates. The surface level of portions of the filter bed may be disturbed in inspecting the condition of the bed, thereby accidently resulting in high spots which form obstructions. Also, during the winter months in outdoor beds ice may easily build-up during conditions of shutdown or extreme cold at various points on the top of the filter bed to a level above the normal lower position of the spreader plates. When this occurs with the device of the present invention, however, normal operation is not interfered with and damage to the spreader plates is avoided since the spreader plates are free to swing upwardly in order to clear the obstructions while automatically swinging downwardly after clearing them to assure continued even distribution of the water. As the spreader plate approaches the obstruction, it will be cammed upwardly by the contact of the obstruction with the downwardly inclined underside of the spreader plate, thereby causing the spreader plate to be elevated and permitting it to slide over the obstruction without damage to the spreader plate. In this operation, the spreader plate would swing upwardly at least to the intermediate position shown in dotted lines in FIG. 5. If the impact was greater, the spreader plate could momentarily swing upward to the upper position indicated in dotted lines in FIG. 5.

The device described above permits a greater economy of manufacture than would otherwise be possible. If the spreader plates were connected rigidly to the spouts it would be necessary to make these elements sufficiently strong to prevent them from being broken if the spreader plate strikes an obstruction on the surface of the filter bed. Even such heavy construction, however, would not completely solve the problem, since it would obviously be undesirable to have the rotation of the apparatus interrupted until such time as the obstruction could be manually removed. With the design described above, it has been found to be quite practical to form the reactor elements providing the chamber 15 and the spout 16 from an integral aluminum casting, and also to form the spreader plate 17 from an integral aluminum casting. Other corrosion-resistant materials such as plastics can be used.

While in the foregoing specification this invention has been described in relation to a specific illustrative embodiment thereof, it will be apparent to those skilled in the art that the invention is susceptible to other embodiments, and that many of the details described herein can be varied considerably without departing from the basic principles of the invention.

We claim:

1. In a reaction propulsion device for distributing sewerage water over a filter bed wherein there is provided a horizontally-extending manifold arm supported for axial rotation about a central hub and adapted to move in an established direction over the upper surface of said filter bed in close proximity thereto, a plurality of separate reactors mounted on said arm at spaced intervals therealong, each of said reactors providing a chamber communicating with the interior of said arm, a discharge spout extending downwardly from said chamber in a direction opposite to the direction of rotation of said arm, and a spreader plate mounted on the lower end of said spout and extending outwardly therefrom below said arm and in the same general direction as said spout, means for each of said reactors interconnecting the lower end of said spout and the inner end of said spreader plate permitting said spreader plate to swing freely around a horizontal axis over an arc of movement between a point at which the outer end of the spreader plate is below its inner end and a point at which the outer end is above its inner end, and positive stop means respectively limiting the downward and upward swinging movement of said spreader plate, the stop means limiting the upward movement of said spreader plate, being arranged to prevent said plates from swinging upwardly beyond a point at which it will automatically swing downwardly after passing over an upwardly-extending obstruction on said filter bed, said spreader plate providing a smooth and normally downwardly inclined undersurface slidably engageable with an obstruction on said filter bed.

2. The combination of claim 1 wherein said reactors and spouts each comprise an integral aluminum casting, and wherein said spreader plates also comprise integral aluminum castings.

3. In a reaction propulsion device adapted for distributing sewerage water over an outdoor filter bed wherein there is provided a horizontally-extending manifold arm supported for axial rotation about a central hub and adapted to move in an established direction over the upper surface of said filter bed in close proximity thereto, a plurality of separate reactors mounted on said arm at spaced intervals therealong, each of said reactors providing a chamber communicating with the interior of said arm, a discharge spout extending downwardly from said chamber in a direction opposite to the direction of rotation of said arm, adjustable weir means between said chamber and spout, and a spreader plate mounted on the lower end of said spout below said arm and extending outwardly therefrom in the same general direction as said spout, means for each of said reactors interconnecting the lower ends of said spouts and the inner ends of said spreader plates permitting said spreader plates to swing freely around a horizontal axis over an arc of movement between a point at which the outer end of the spreader plate is below its inner end and a point at which the outer end is above its inner end, and positive stop means respectively limiting the downward and upward swinging movement of said spreaders, the stop means which limits the downward movement of said spreader plates being adjustable so that the normal downward inclination of said plates can be selectively varied, said spreader plates each providing a smooth and normally downwardly inclined undersurface slidably engageable with an obstruction on said filter bed.

4. The combination of claim 3 wherein said reactors and spouts each comprise an integral aluminum casting, and wherein said spreader plates also comprise integral aluminum castings.

5. The structure of claim 3 in which the undersurface of each of said spreader plates adjacent the lower end thereof curves upwardly to provide a rounded surface portion for riding over filter bed obstructions.

References Cited in the file of this patent

UNITED STATES PATENTS

| | | |
|---|---|---|
| 539,661 | Bastam | May 21, 1895 |
| 630,766 | Bastam | Aug. 8, 1899 |
| 1,342,124 | McNeil | June 1, 1920 |
| 1,543,009 | Hedges | June 23, 1925 |
| 1,803,967 | Good | May 5, 1931 |
| 2,225,836 | Lund | Dec. 24, 1940 |
| 2,333,177 | Hodges | Nov. 2, 1943 |
| 2,767,020 | Knowles | Oct. 16, 1956 |
| 2,889,996 | Kadden | June 9, 1959 |
| 2,926,856 | Lawler et al. | Mar. 1, 1960 |

FOREIGN PATENTS

| | | |
|---|---|---|
| 220,926 | Germany | Apr. 13, 1910 |